(12) United States Patent
Hegde et al.

(10) Patent No.: US 9,588,551 B1
(45) Date of Patent: Mar. 7, 2017

(54) FABRIC ELECTRONIC DEVICE HOUSINGS

(71) Applicant: Apple Inc., Cupertino, CA (US)

(72) Inventors: Siddhartha Hegde, San Jose, CA (US); Benjamin A. Cousins, Burlington (CA); Benjamin A. Shaffer, San Jose, CA (US); Samuel G. Smith, San Francisco, CA (US); Melody Kuna, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/843,634

(22) Filed: Sep. 2, 2015

(51) Int. Cl.
*G06F 1/16* (2006.01)

(52) U.S. Cl.
CPC .......... *G06F 1/1675* (2013.01); *G06F 1/1662* (2013.01)

(58) Field of Classification Search
CPC ..................................................... G06F 1/1675
See application file for complete search history.

(56) References Cited

U.S. PATENT DOCUMENTS

| | | | |
|---|---|---|---|
| 7,102,614 B2 | 9/2006 | Sandbach et al. | |
| 7,104,715 B2 | 9/2006 | Lahr | |
| 7,569,795 B2 | 8/2009 | Ferguson | |
| 8,537,537 B2* | 9/2013 | Tabasso | G06F 1/1632 165/80.2 |
| 2004/0203509 A1 | 10/2004 | Mahn | |
| 2007/0176902 A1 | 8/2007 | Newman et al. | |
| 2009/0291266 A1 | 11/2009 | Wakisaka | |
| 2011/0032127 A1 | 2/2011 | Roush | |
| 2014/0069791 A1 | 3/2014 | Chu et al. | |
| 2014/0262715 A1 | 9/2014 | Lee et al. | |

FOREIGN PATENT DOCUMENTS

EP    2481556    8/2012

\* cited by examiner

*Primary Examiner* — Anthony Q Edwards
(74) *Attorney, Agent, or Firm* — Treyz Law Group, P.C.; G. Victor Treyz; Kendall W. Abbasi

(57) ABSTRACT

An electronic device such as a cover for a portable device or other electronic equipment may have circuitry mounted in a housing. The housing may be formed from layers of material such as fabric and polymer layers. The fabric may be formed from woven polymer yarn. The fabric may be treated with chemicals to improve stain resistance and wear resistance, may be provided with a polymer backing layer, and may receive molded plastic structures. Patterned areas may be woven into the fabric, may be formed by placing coatings on selected portions of the fabric, or may be formed by embroidering or otherwise locally processing the fabric. The patterned areas may form labels for keyboard keys, logos, key trim patterns, and other features for an electronic device. Patterned areas may have locally enhanced light transmission characteristics and may be backlit.

24 Claims, 11 Drawing Sheets

FABRIC ELECTRONIC DEVICE HOUSINGS

BACKGROUND

This relates generally to electronic devices, and, more particularly, to forming layers of material for housing walls and other electronic device structures.

Electronic devices such as computers, cellular telephones, and other devices include integrated circuits and other electrical components. These components may be enclosed within electronic device housing walls formed from plastic and metal layers.

It can be challenging to provide an electronic device structure such as housing walls with desired attributes. Housing walls should be sufficiently durable to withstand wear and tear from normal use. At the same time, housing walls should have an appealing appearance while accommodating internal electrical components.

It would therefore be desirable to be able to provide improve electronic device housings.

SUMMARY

An electronic device such as a cover for a portable device or other electronic equipment may have circuitry mounted in a housing. The housing may be formed from layers of material such as fabric and polymer layers. The fabric may be formed from woven polymer yarn. The fabric may be treated with chemicals to improve stain resistance and wear resistance, may be provided with a polymer backing layer, and may receive molded plastic structures. The fabric may be embossed to create local raised and lowered areas. Housings may be formed from tubes of fabric and fabric that has been formed by knitting, braiding, and other techniques for intertwining strands of material.

Patterned areas may be woven into the fabric, may be formed by placing coatings on selected portions of the fabric, may be formed by embroidering certain portions of the fabric, or may be formed by otherwise locally processing the fabric. The patterned areas may form labels for keyboard keys, logos, key trim patterns, and other features for an electronic device. Patterned areas may have locally enhanced light transmission characteristics and may be backlit.

DETAILED DESCRIPTION

An electronic device may have housing structures and other structures formed from plastic, metal, and other materials. Some structures may be formed from layers of material (e.g., plastic, metal, and/or other materials). Other structures may be formed from intertwined strands of material (e.g., fabric).

Figure 1:
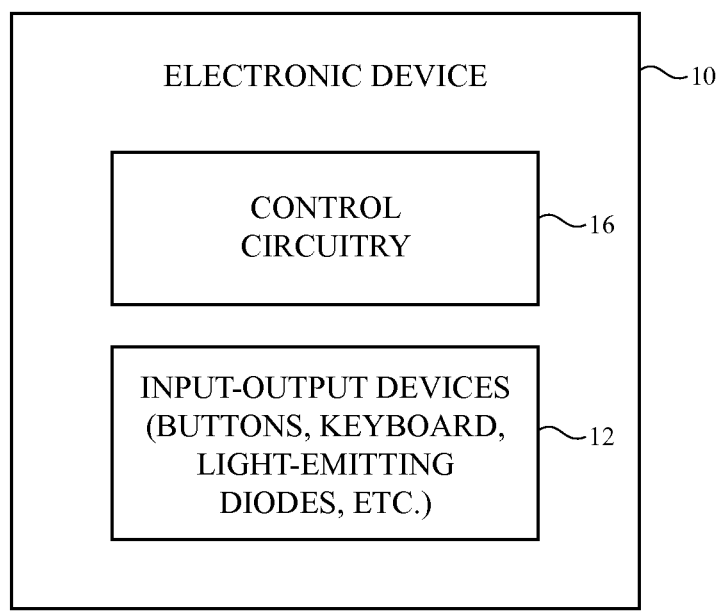
FIG. 1 is a schematic diagram of an illustrative electronic device in accordance with an embodiment.

A schematic diagram of an illustrative electronic device with structures such as housing structures that are formed using fabric is shown in FIG. 1. Device 10 may be a tablet computer, laptop computer, a desktop computer, a display, a cellular telephone, a media player, a wristwatch device or other wearable electronic equipment, headphones, an accessory such as a cover or other enclosure for an electronic device such as a tablet computer or other portable device, equipment embedded in a larger system, electronic equipment associated with furniture or a vehicle, equipment in a building, or other suitable electronic device.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, displays, etc. A user can control the operation of device 10 by supplying commands through input-output devices 12 and may receive status information and other output from device 10 using the output resources of input-output devices 12. If desired, device 10 may be coupled to an external device (e.g., a host device or an auxiliary device) using a cable and/or a wireless signal path. In this type of arrangement, device 10 may gather user input that is routed to the coupled external device and may receive information from the external device that is presented to the user with the output resources of device 10.

Figure 2:
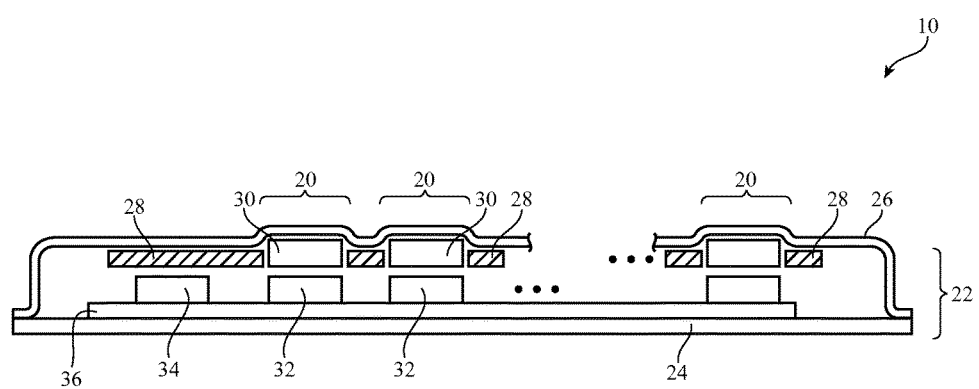
FIG. 2 is a cross-sectional side view of an illustrative electronic device in accordance with an embodiment.

FIG. 2 is a cross-sectional side view of an illustrative electronic device. In the example of FIG. 2, device 10 is a cover (or part of a cover) for a tablet computer or other electronic equipment. Device 10 may have housing structures formed from plastic, metal, glass, ceramic, carbon-fiber composites, fiberglass, and other fiber composites, fabric and other intertwined strands of material, and/or other materials. As an example, device 10 may have components that are mounted within a housing body formed from lower housing layer 24 and upper housing layer 26. Lower housing layer 24 may be formed from plastic, plastic with embedded microfibers, or other materials. Upper housing layer 26 may be formed from fabric. The fabric of layer 26 may include strands of material that have been intertwined using weaving techniques, knitting techniques, braiding techniques, or other techniques for intertwining strands of material.

The strands of material in the fabric of layer 26 may be polymer strands, metal strands, glass strands, strands of material that include a core of one material (e.g., polymer) that is coated with one or more additional materials (e.g., a metal layer, a dielectric outer coating, etc.). The strands of material in layer 26 may be monofilaments or multi-filament strands (sometimes referred to as yarn or thread).

Device 10 may include a keyboard (e.g., a computer keyboard for an associated tablet computer, laptop computer, or other computing equipment). The keyboard may have an array of keys 20 that are covered by fabric layer 26. Each key 20 may have a movable button member such as key cap 30 and an associated switch such as key switch 32. Key caps 30 may be mounted in openings in a support structure such as key web 28 (e.g., a plastic panel with rectangular openings and other openings configured to receive respective key caps 30 or other button members). Key web 36 may supply structural support for fabric layer 26 and may therefore form an internal frame for the upper housing wall of device 10. Key switches 32 may be mounted on substrate 36. Substrate 36 may be a printed circuit board that contains metal traces for forming signal paths to interconnect support circuitry 34 (e.g., one or more integrated circuits) with key switches 32.

Figure 3:
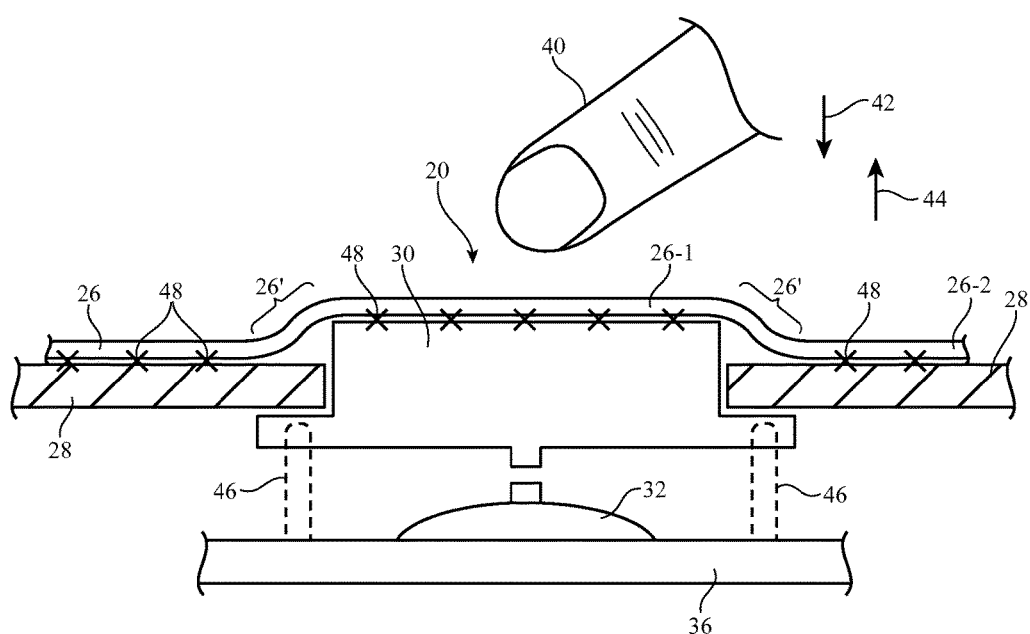
FIG. 3 is a cross-sectional side view of an illustrative key for a keyboard in accordance with an embodiment.

FIG. 3 is a cross-sectional side view of a portion of device 10. As shown in FIG. 3, key cap 30 may be aligned with key switch 32 so that key switch 32 may be actuated when a user's finger (finger 40) presses downwards in direction 42 on the key formed from key cap 30 and switch 32. Switch 32 may be a dome switch or other switch mounted on printed circuit 36. Support structures 46 (e.g., a butterfly mechanism or other hinge mechanism) may be used to provide support for key cap 30 and to provide a restoring force that biases key cap 30 upwards in direction 44 when the user releases key 20.

Fabric layer 26 may be attached to the upper surface of device 10 and may cover key web 28 and the upper surfaces of key caps 30 in keys 20. Adhesive 48, injection-molded portions of key web 28, or other suitable attachment mechanisms may be used to attach portion 26-2 of fabric layer 26 to key web 28. Adhesive 48 and/or other attachment mechanisms may also be used to attach portion 26-1 of fabric layer 26 to key caps 30 or portions 26-1 may be free of adhesive 48. The key cap in each key may be surrounded by peripheral portions 26' of fabric layer 26. If, for example, key caps 30 are rectangular, peripheral portions 26' may have the shape of rectangular rings. The peripheral boundary portion 26' of fabric layer 26 that surrounds each key 20 is preferably sufficiently flexible to allow key caps 30 to travel freely both in outwards direction 44 and inwards direction 42 during use of the keyboard by a user.

Fabric 26 may be formed from intertwined strands of material using weaving equipment (to form woven fabric), knitting equipment (to form knitted fabric), braiding equipment (to form braided fabric), or using other strand intertwining equipment (e.g., equipment for forming felt). Any suitable fabric construction may be used for fabric 26. With one suitable configuration, which may sometimes be described herein as an example, fabric 26 may be woven fabric. Woven fabric may have a plain weave, a basket weave, or other suitable types of weave.

Figure 4:
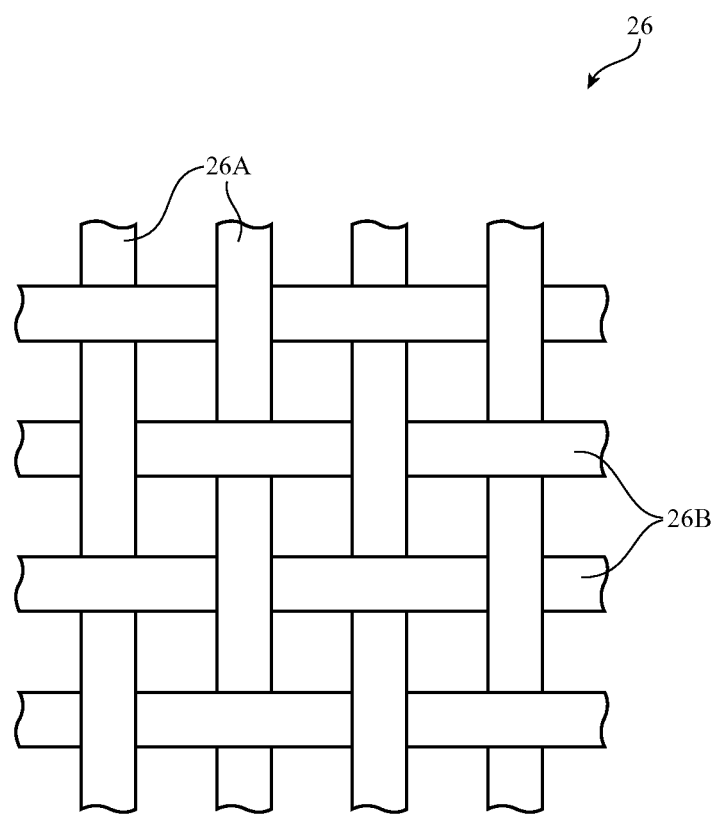
FIG. 4 is a top view of an illustrative fabric for use in forming housing walls and other electronic device structures in accordance with an embodiment.

A portion of an illustrative fabric layer such as layer 26 that has been woven using a plain weave is shown in FIG. 4. As shown in FIG. 4, fabric 26 may have sets of perpendicular strands of material such as warp strands 26A and weft strands 26B. Plain-weave fabric such as fabric 26 of FIG. 4 may exhibit satisfactory durability to serve as an outer housing layer in the housing walls of device 10 (e.g., to cover keys 20) and may have an attractive appearance and texture. Other types of weaving patterns may be used in forming fabric 26 if desired. The plain-weave configuration of FIG. 4 is merely illustrative.

Figure 5:
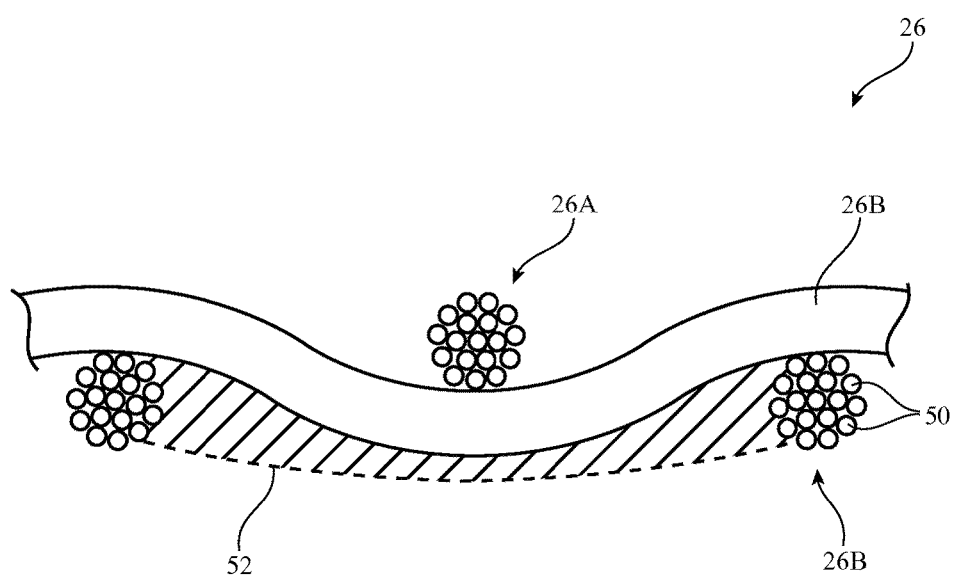
FIG. 5 is a cross-sectional side view of an illustrative fabric layer in accordance with an embodiment.

It may be desirable to form strands such as warp strands 26A and 26B from multiple filaments. A cross-sectional side view of fabric 26 of FIG. 4 is shown in FIG. 5. As shown in FIG. 5, fabric 26 may include warp strands 26A and weft strands 26B. Warp strands 26A and weft strands 26B may be formed from strands of yarn that contain multiple filaments such as filaments 50 (i.e., multiple monofilaments). An optional coating layer such as coating layer 52 may be formed on the inner surface of fabric 26 and may serve as a backing layer for fabric 26. Layer 52 may be formed from a polymer such as polyurethane or other suitable material.

There may be any suitable number of filaments in the yarn that makes up warp strands 26A and weft strands 26B. With one illustrative configuration, the number of filaments in this yarn may be 36, may be more than 30, may be less than 50, may be 20-60, may be 10-100, may be less than 70, may be less than 200, may be less than 50, may be more than 2, may be more than 10, may be more than 20, may be 25-75 or may be any other suitable number. Yarns with large number of filaments 50 (e.g., more than 100 or more than 200) may be soft, but may not be as robust as yarns with fewer filaments 50 (e.g., fewer than 100, fewer than 50, etc.).

The thread density of fabric 26 (i.e., the number of yarns per square inch) may be about 100-300 yarns (threads) per square inch, may be more than 150 yarns per square inch, may be less than 250 yarns per square inch, may be 125-225 yarns per square inch, may be more than 50 yarns per square inch, may be more than 170 yarns per square inch, may be less than 210 yarns per square inch, may be 190 yarns per square inch, may be 150-230 yarns per square inch, or may have any other thread density value. As an example, warp strands 26B may have a density of about 5-20 ends per inch and weft strands 26A may have a density of about 5-25 picks per inch (as examples).

The yarn in fabric 26 may have a linear mass density of 36 denier, 20-50 denier, 25-45 denier, 10-100 denier, 30-200 denier, more than 10 denier, more than 20 denier, more than 30 denier, less than 100 denier, less than 60 denier, or less than 40 denier (as examples). Yarn visibility (which impacts device aesthetics) may be particularly satisfactory at levels below 300 denier or 200 denier. Abrasion resistance may be enhanced by using yarn with a linear mass density of more than 20 denier or more than 30 denier.

Yarn for fabric 26 (e.g., yarn for warp strands 26A and/or weft strands 26B) may be formed from polymer or other suitable materials. For example, filaments 50 may be formed from a polyethylene terephthalate material such as polyester (e.g., strands 26A and 26B may be untextured 50D/36F polyester yarn). Examples of other polymers that may be used in forming filaments 50 include polyamide (nylon— e.g., nylon6, nylon6,6, nylon 11), aromatic polyamide (i.e., para-aramids such as Kevlar® or other aramids), polyimide, polyolefin, acrylic, polyethylene, extruded cellulosic polymers such as rayon and Tencel® and polyurethane. Other polymers or mixtures of these polymers may be used, if desired. Non-polymer materials may also be used for some or all of filaments 50 if desired. Polyester tends to exhibit low amounts of water absorption (e.g., less water absorption than nylon), which can enhance durability.

If desired, tumbling equipment or other fabric processing equipment may be used to soften fabric 26 after weaving. Polymer coating equipment or other deposition equipment may be used to deposit backing layer material or other coatings. Molding equipment may be used to mold thermoplastic structures onto fabric 26. Laser processing tools and/or other tools may selectively remove portions of fabric 26 in region 26' or other portions of fabric 26 to adjust the stiffness of fabric 26.

Figure 6A:
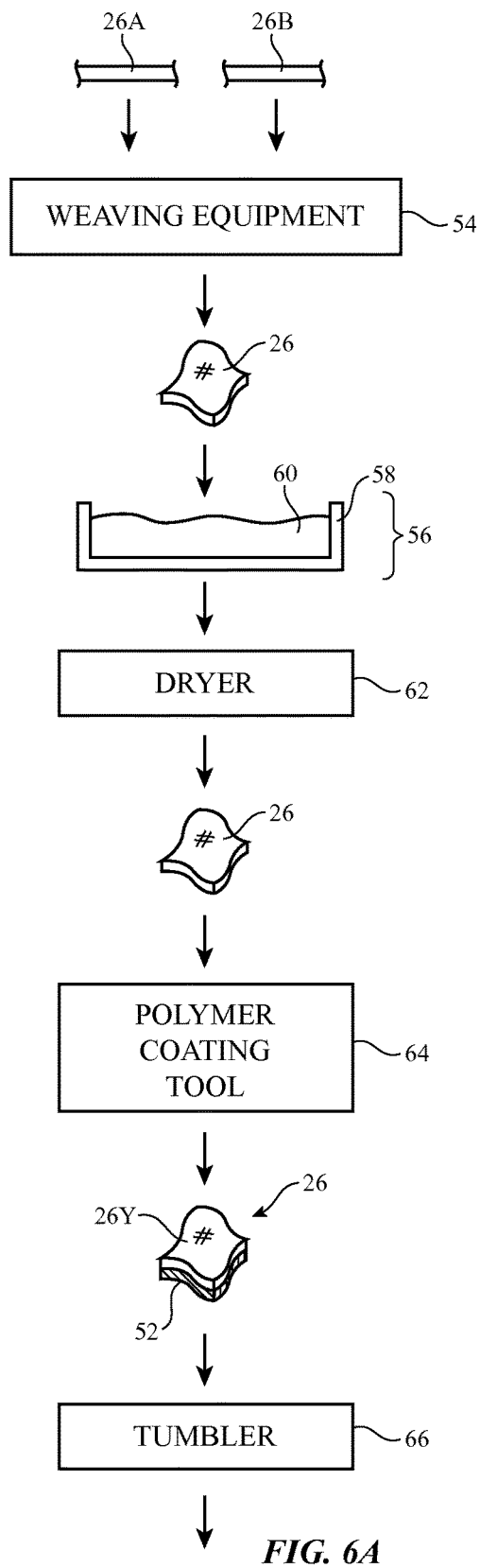
FIGS. 6A and 6B are diagrams showing illustrative equipment and operations involved in forming fabric-based housing structures such as housing wall structures in accordance with an embodiment.
Figure 6B:
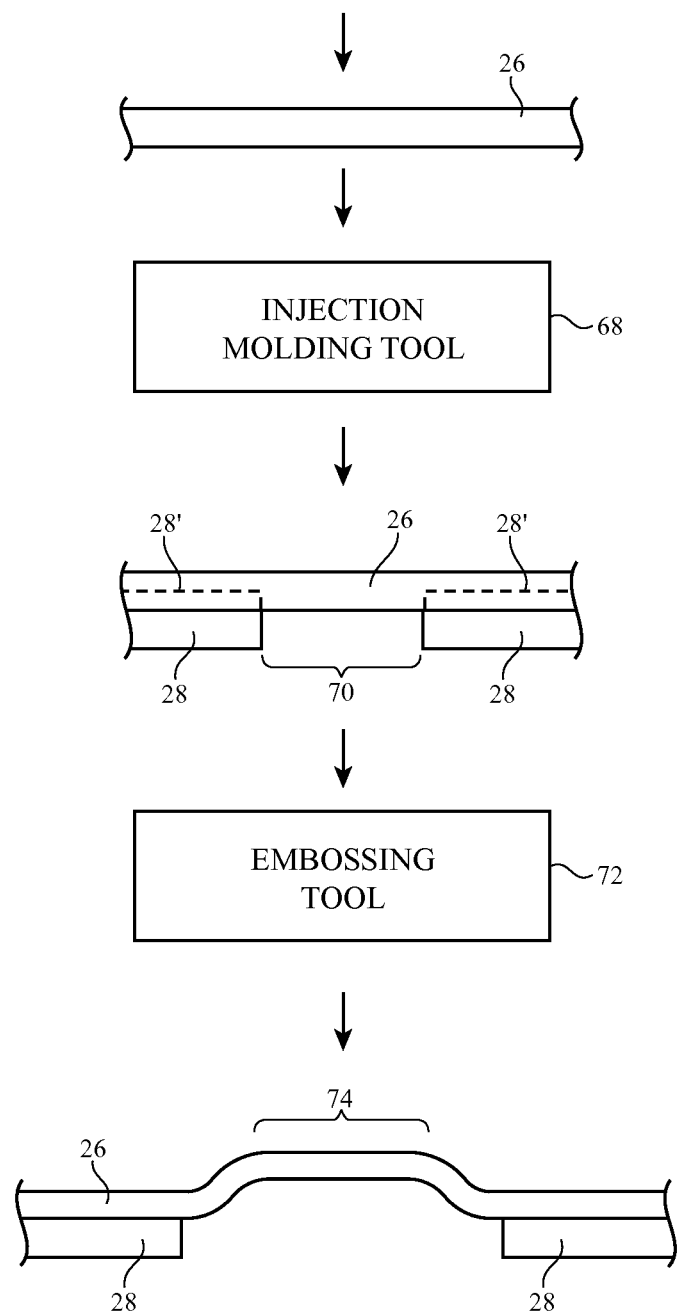

Illustrative equipment and operations involved in forming electronic devices and electronic structures for devices 10 using layers of material such as fabric 26 are shown in FIGS. 6A and 6B.

As shown in FIG. 6A, yarns such as warp yarn 26A and weft yarn 26B may be woven to form fabric 26 using weaving equipment 54.

Following weaving, fabric 26 may be treated with a durable water repellant coating using equipment 56. For example, fabric 26 may be submersed in chemical treatment bath 60 in vessel 58 of coating equipment 56. Chemical bath 60 may include chemicals such as fluorocarbon compounds or other organofluorine compounds (as examples). Treatment in bath 60 may increase water repellency, may increase durability, and may increase stain resistance.

Dryer 62 may dry fabric 26 following chemical treatment in bath 60.

Polymer coating tool 64 may include knife coating equipment or other coating equipment to apply a polymer backing to fabric 26, as illustrated by polymer backing layer 52 on yarn portion 26Y of fabric layer 26. Backing layer 52 may have a density of 2.5 g/m$^2$, more than 0.5 g/m$^2$, less than 20 g/m$^2$, or other suitable density. The polymer of layer 52 may be polyurethane or other suitable polymer. If desired, other types of coating layers may be added to fabric 26. The use of a polymer such as polyurethane is merely illustrative.

The application of polymer coating layer 52 may increase the stiffness of fabric 26. If desired, fabric 26 may be processed to reduce the stiffness of fabric 26. For example, fabric 26 may be softened using tumbler 66.

As shown in FIG. 6B, following softening in tumbler 66, plastic structures such as key web 28 may be molded onto fabric 26 using injection molding tool 68. During injection molding, molten plastic may flow into the openings between warp strands 26A and weft strands 26B as illustrated by flowing plastic portion 28' of web 28 and/or the molten plastic may bond to backing layer material such as layer 52, thereby securing key web 28 to fabric 26. The mold die used in molding tool 68 may have portions that prevent molded plastic from reaching fabric 26 in selected areas (e.g., to form areas such as area 70 in fabric 26 that are uncoated by the molded plastic). The plastic-free openings formed in areas 70 may be used to form keys 20 (in the present example). If desired, other types of molded plastic features may be formed using injection molding tool 68 such as support structures, brackets, frames, screw bosses, connector mounts, sensor housings, etc.

Following the formation of key web 28 on the inner surface of fabric 26, embossing tool 72 may create raised and/or lowered features in fabric 26. Tool 72 may contain a heated die or other structures that can be used to emboss features into fabric 26 using heat and pressure. Raised portion 74 of FIG. 6B may be associated with one of keys 20 (e.g., the embossed portions of fabric 26 may overlap respective keys 20). Other protruding and/or recessed features may be formed in fabric 26 using embossing equipment, if desired. The illustrative configuration of FIG. 6B is merely illustrative. Following embossing and, if desired, additional processing operations (e.g., operations such as printing operations using printing equipment, embroidery operations involving sewing equipment, operations involving application of laser light, heat treatment, or other application of energy, machining equipment operations, etc.) fabric 26 may be integrated with other device structures to complete assembly of device 10.

Figure 7:
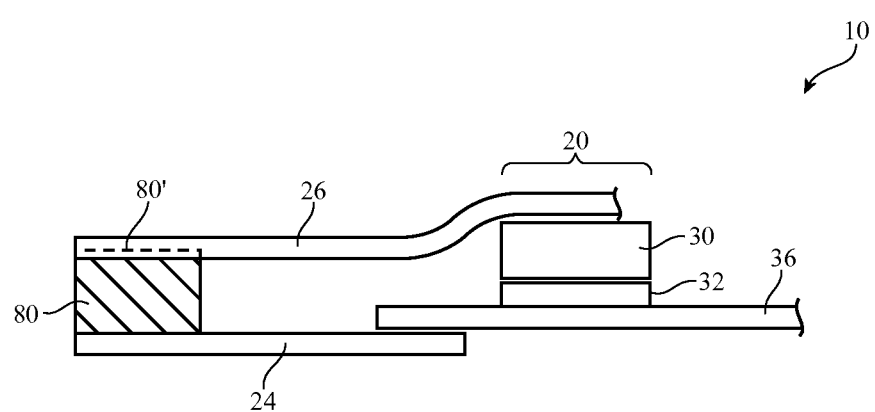
FIG. 7 is a cross-sectional side view of an edge portion of an illustrative electronic device having a fabric layer and molded structures in accordance with an embodiment.

If desired, molded plastic (e.g., plastic molded using equipment such as equipment 68 of FIG. 6B) may be used to attach fabric layer 26 to structures in device 10 or to form other mechanical features for device 10. As shown in the illustrative cross-sectional side view of the edge of device 10 of FIG. 7, for example, plastic 80 may be molded along the edge of device 10 between fabric 26 (which serves as an upper housing layer for device 10) and lower housing layer 24, thereby forming a peripheral seal and structural element that joins layers 26 and 24 together. Portions of plastic 80 may flow into openings in fabric layer 26 (as shown by illustrative plastic portion 80' of FIG. 7) and/or may be bonded to backing layer 52 (as examples).

It may be desirable to locally modify the physical properties of fabric 26 during weaving (or other yarn intertwining operations) and/or after forming fabric 26 and thereby form patterned areas with desired modified fabric properties. It may, as an example, be desirable to modify fabric 26 in one or more locations on fabric 26 to increase or decrease fabric stiffness, to change fabric stretchiness, to change fabric water resistance or stain resistance, to modify the light transmission properties of fabric 26, to change fabric color, etc.

Figure 8:
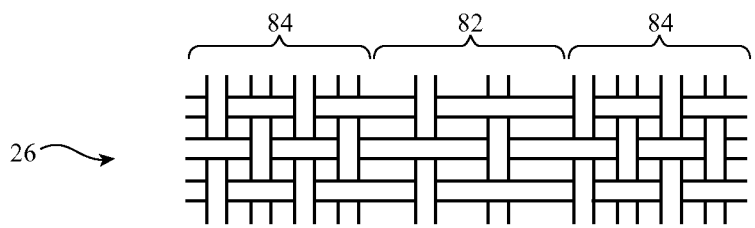
FIG. 8 is a diagram of an illustrative fabric having a fabric construction that varies as a function of position to adjust the appearance and properties of the fabric in accordance with an embodiment.

In the illustrative example of FIG. 8, portion 82 of fabric 26 has been modified relative to portions 84. In particular, during weaving, fabric 26 of FIG. 8 was woven so as to have portions with a tighter weave (more yarns per unit area) such as portions 84 and so as to have portions with a looser weave (fewer yarns per unit area) such as portions 82. Looser weaves may allow more moisture, air, sound, and light to pass through fabric 26 than tighter weaves. For example, portion 82 may be used as an audio port, a sensor window, a light-emitting diode window or other optical window, etc. Different fabric densities and other localized changes to the construction of fabric 26 that are produced by the weaving, knitting, or braiding equipment that is forming fabric 26 may also change the outward appearance of fabric 26 (e.g., to provide portions of fabric 26 with different colors, different light transmissions, different textures, different stiffnesses, etc.).

Figure 9:
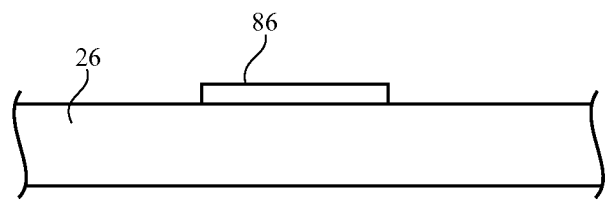
FIG. 9 is a cross-sectional side view of an illustrative layer of material such as a fabric layer with a patterned coating layer such as a printed layer in accordance with an embodiment.

As shown in FIG. 9, coatings such as coating 86 may be deposited on portions of fabric 26. Coating 86 may be, for example, a layer of colored or metallic paint (ink), plastic, metal, or other material that is deposited in a particular area on the surface of fabric 26. Coating 86 may be deposited by screen printing, pad printing, ink-jet printing, dripping, spraying, evaporation or other physical vapor deposition techniques, lamination, blanket film deposition followed by photolithographic patterning or other types of patterning, shadow mask deposition, etc.

Figure 10:
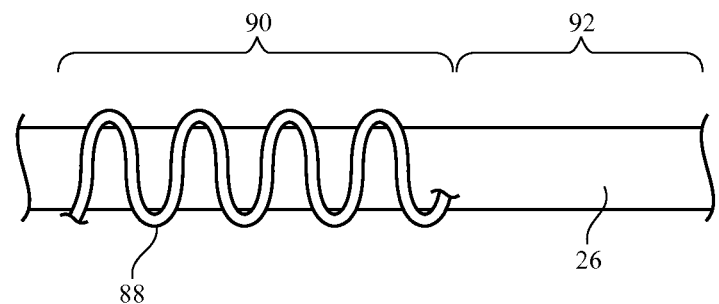
FIG. 10 is a cross-sectional side view of an illustrative layer of material with an embossed region in accordance with an embodiment.

In the configuration of FIG. 10, fabric layer 26 has been embroidered. In particular, one or more strands of material such as thread 88 has been sewn into fabric 26 to pattern a selected area of fabric 26. Embroidered areas such as patterned area 90 of FIG. 10 may have different textures, appearances, conductivities, light transmission characteristics, stiffnesses, and/or other characteristics than non-embroidered areas such as area 92.

Figure 11:
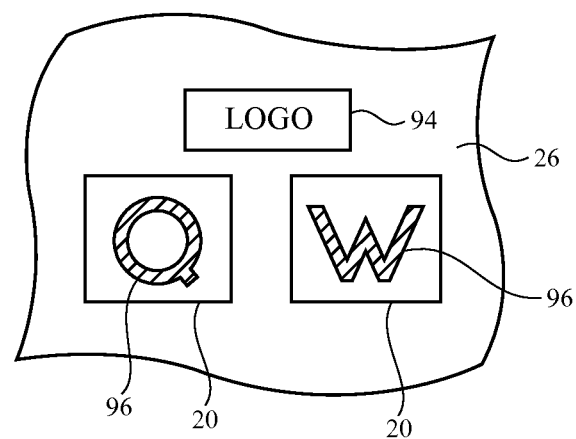
FIG. 11 is a top view of a portion of an illustrative electronic device having a fabric housing with patterned portions that include a logo and labeled keys in accordance with an embodiment.

As shown in FIG. 11, weaving techniques, embroidery techniques, painting techniques and other coating techniques, and/or other techniques for locally modifying fabric 26 may be used to create patterns in fabric 26. As an example, a logo such as logo 94 may be woven into fabric 26, may be applied as a coating on fabric 26, may be created by embroidery, and/or may be formed using other techniques for selectively modifying portions of fabric 26 to create desired patterned areas. Local modification techniques such as these may also be used to create patterned areas for alphanumeric labels 96 on keys 20 or other text, graphical elements, trim patterns (e.g., key trim patterns aligned with keys 20), etc.

Figure 12:
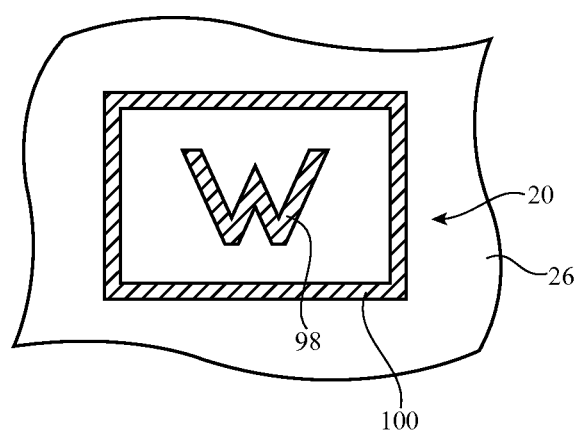
FIG. 12 is a top view of a portion of an illustrative electronic device having keys with backlight patterned portions in accordance with an embodiment.

In the example of FIG. 12, key 20 has been provided with a locally modified portion such as portion 98 (e.g., an alphanumeric key label or other label or icon) surrounded by rectangular ring-shaped trim region 100. The patterned portion of fabric 26 that forms trim 100 may have a different appearance (color, texture, etc.) than other portions of fabric 26. For example, trim 100 may be characterized by a greater light transmittance than other portions of fabric 26, thereby allowing key 20 to be provided with a rectangular backlit appearance by providing key 20 with backlight illumination from a backlight unit in device 10. Labels such as label 98, logos such as logo 94, and/or other patterned areas of enhanced light transmission in fabric 26 may also be illuminated with backlight illumination from device 10 if desired. The structures may be provided with an enhanced transparency relative to other portions of fabric 26 by selectively incorporating transparent yarn portions into fabric 26, by selectively removing opaque layers such as backing layer 52 from particular portions of fabric 26, by reducing the density of the yarns in selected areas of fabric 26, etc.

Figure 13:
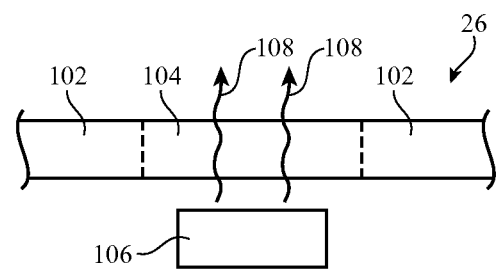
FIG. 13 is a cross-sectional side view of an illustrative housing structure such as a fabric housing layer for an electronic device with internal light-emitting components such as key backlight components in accordance with an embodiment.

FIG. 13 is a cross-sectional side view of an illustrative layer of fabric 26 that has a portion of enhanced transparency such as portion 104. Portion 104 may be formed by weaving portion 104 with a looser weave than surrounding portions of fabric 26 such as portions 102 or by otherwise enhancing the light transmission characteristics of portion 104 relative to portions 102. Portion 104 may have a pattern that allows portion 104 to serve as trim for a key (see, e.g., portion 100 of FIG. 12), that allows portion 104 to serve as an alphanumeric key label, that allows portion 104 to form a logo such as logo 94 of FIG. 11, etc. A light-emitting diode or other light source 106 in device 10 may emit light 108. Light 108 may pass through layer 104 for viewing by a user.

Figure 14:
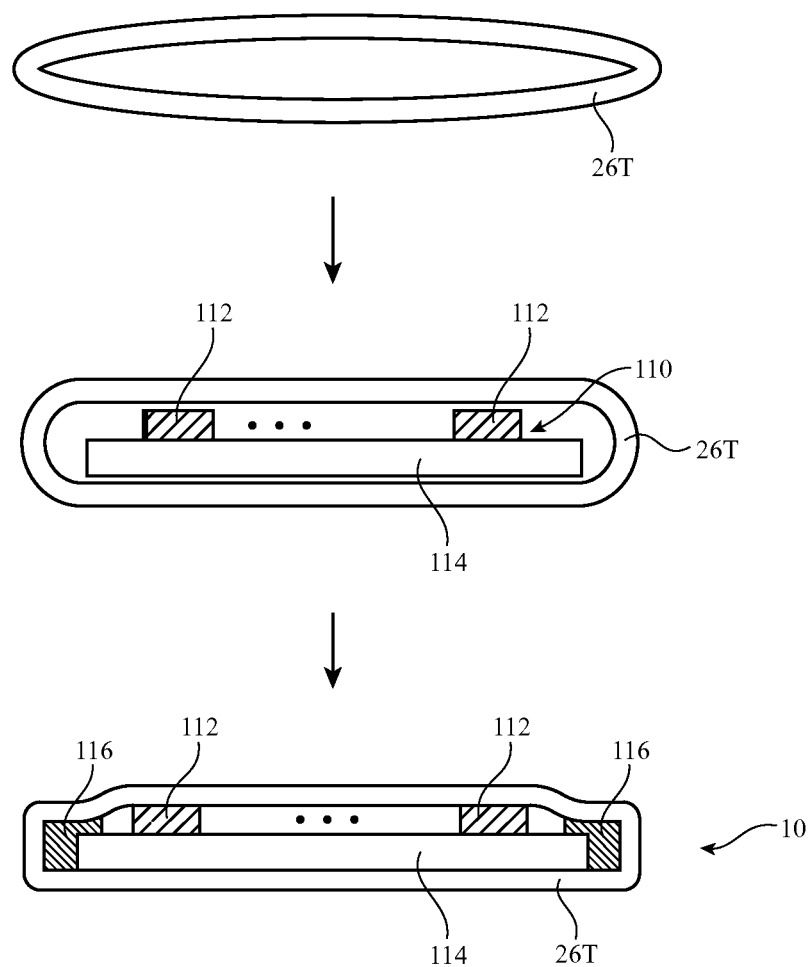
FIG. 14 is a cross-sectional side view of an illustrative tube of fabric being used to enclose circuitry for an electronic device in accordance with an embodiment.

FIG. 14 is a cross-sectional side view of an illustrative tube shaped layer of fabric. Tube-shaped fabric layer 26T may be formed using weaving, knitting, braiding, or other strand intertwining techniques. Following formation of fabric tube 26T, circuitry 110 such as electrical components 112 on printed circuit 114 may be mounted within the interior of layer 26T. Layer 26T may then be shaped using heat and/or pressure (e.g., in an embossing tool), may receive molded plastic structures such as illustrative injection-molded plastic edge structures 116, and/or may be attached to circuitry 110 using adhesive, thereby forming electronic device 10 (e.g., a keyboard, etc.). This type of approach allows a unitary piece of fabric to serve as opposing front and rear walls in an electronic device. Injection molded edge caps or other structures may be used to seal the opposing ends of fabric tube 26T, as described in connection with molded plastic edge structures 80 of FIG. 7.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   circuitry;
   a housing that encloses the circuitry;
   a fabric layer that forms at least part of the housing; and
   a polymer backing layer on an inner surface of the fabric layer.

2. The electronic device defined in claim 1 wherein the fabric layer includes woven yarn.

3. The electronic device defined in claim 2 wherein the yarn has a linear mass density of 30 to 200 denier.

4. The electronic device defined in claim 3 wherein the fabric layer has a thread density of 100-300 yarns per square inch.

5. The electronic device defined in claim 4 wherein the woven yarn comprises 10-100 filaments.

6. The electronic device defined in claim 5 wherein the woven yarn comprises untextured yarn.

7. The electronic device defined in claim 5 wherein the filaments comprise polymer filaments.

8. The electronic device defined in claim 7 wherein the polymer filaments comprise polyester.

9. The electronic device defined in claim 5 wherein the circuitry comprises keyboard keys and wherein the fabric overlaps the keyboard keys.

10. The electronic device defined in claim 9 wherein the polymer backing layer comprises polyurethane.

11. A method for forming a fabric electronic device housing layer, comprising:
    weaving yarn to form a fabric using a weaving tool;
    injection molding plastic to form a plastic structure attached to the fabric; and
    embossing the fabric with an embossing tool.

12. The method defined in claim 11 wherein injection molding the plastic comprises injection molding plastic over first portions of the fabric without injection molding plastic over second portions of the fabric.

13. The method defined in claim 12 wherein embossing the fabric comprises forming raised portions in the second portions of the fabric.

14. The method defined in claim 13 further comprising:
    immersing the fabric in a chemical bath; and after immersing the fabric in the chemical bath, drying the fabric.

15. The method defined in claim 14 further comprising:
tumbling the dried fabric to soften the fabric; and
applying a polymer backing layer to the fabric before injection molding the plastic.

16. An electronic device, comprising:
a printed circuit board;
electrical components on the printed circuit board; and
woven fabric with polymer yarn that covers the electrical components, wherein the woven fabric has patterned regions aligned with the electrical components.

17. The electronic device defined in claim 16 wherein the electrical components comprise keyboard keys.

18. The electronic device defined in claim 17 wherein the patterned regions comprise regions of the woven fabric with locally enhanced light transmission.

19. The electronic device defined in claim 18 wherein the patterned regions comprise patterns selected from the group consisting of: alphanumeric labels and key trim patterns.

20. The electronic device defined in claim 19 wherein the patterned regions comprise portions of the woven fabric with locally reduced thread density.

21. The electronic device defined in claim 16 wherein the woven fabric comprises a woven fabric tube.

22. The electronic device defined in claim 16 further comprising molded plastic features that are molded onto the woven fabric.

23. The electronic device defined in claim 16 wherein the patterned regions comprise embroidered regions.

24. The electronic device defined in claim 16 wherein the electrical components comprise keyboard keys, wherein the woven fabric has embossed regions aligned with the keyboard keys, and wherein the patterned regions overlap the embossed regions.

* * * * *